United States Patent
Mogami et al.

(10) Patent No.: US 12,398,300 B2
(45) Date of Patent: Aug. 26, 2025

(54) ADHESIVE COMPOSITION

(71) Applicant: Fujikura Kasei Co., Ltd., Tokyo (JP)

(72) Inventors: Hirokazu Mogami, Kuki (JP); Miki Taketani, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 587 days.

(21) Appl. No.: 17/904,426

(22) PCT Filed: Mar. 9, 2021

(86) PCT No.: PCT/JP2021/009218
§ 371 (c)(1),
(2) Date: Aug. 17, 2022

(87) PCT Pub. No.: WO2021/182449
PCT Pub. Date: Sep. 16, 2021

(65) Prior Publication Data
US 2023/0098761 A1    Mar. 30, 2023

(30) Foreign Application Priority Data
Mar. 10, 2020 (JP) .................................. 2020-040491

(51) Int. Cl.
C09J 133/10 (2006.01)
C09J 153/00 (2006.01)

(52) U.S. Cl.
CPC ......... *C09J 133/10* (2013.01); *C09J 153/005* (2013.01); *C09J 2301/414* (2020.08)

(58) Field of Classification Search
CPC .................................................. C09J 153/005
See application file for complete search history.

(56) References Cited

U.S. PATENT DOCUMENTS

2016/0326411 A1    11/2016  Mogami et al.
2020/0270413 A1*   8/2020   Koes ........................ C08J 5/244

FOREIGN PATENT DOCUMENTS

| JP | 2001181591 A | 7/2001 |
|---|---|---|
| JP | 2002146316 A | 5/2002 |
| JP | 2015151452 A | 8/2015 |
| JP | 2016056296 A | 4/2016 |
| JP | 2016216524 A | 12/2016 |
| JP | 2017066231 A | 4/2017 |
| JP | 2018003035 A | 1/2018 |
| JP | 2018535283 A | 11/2018 |
| TW | 201040238 A1 | 11/2010 |
| TW | 201527468 A | 7/2015 |
| WO | 2018151034 A1 | 8/2018 |
| WO | 2020032163 A1 | 2/2020 |

OTHER PUBLICATIONS

PCT Office, International Search Report issued in PCT/JP2021/009218 dated Jun. 8, 2021.
Taiwan Patent Office, Office Action issued in TW110108327 dated Mar. 4, 2022.
European Patent Office, Search Report issued in EP 21768653.4 dated Mar. 6, 2024.

\* cited by examiner

*Primary Examiner* — Wenwen Cai
(74) *Attorney, Agent, or Firm* — Wood Herron & Evans LLP

(57) ABSTRACT

An adhesive composition of one aspect of the present invention contains a block copolymer composed of a polymer block A which includes a (meth)acrylate ester unit having a linear or branched side chain of 1 to 8 carbon atoms and has a number average molecular weight of 2,000 to 10,000, a polymer block B which includes at least one of an aromatic vinyl compound unit and a (meth)acrylate ester unit having a cyclic structure, and a polymer block C which includes a (meth)acrylate ester unit having a linear or branched side chain of 1 to 8 carbon atoms, wherein the mass ratio (B/C) between the polymer block B and the polymer block C is within a range from 5.0/95.0 to 30.0/70.0, the mass ratio (A/(B+C)) between the polymer block A and the total of the polymer block B and the polymer block C is within a range from 0.1/99.9 to 5.0/95.0, and the acid value of the block copolymer is at least 8 mgKOH/g.

4 Claims, No Drawings

ADHESIVE COMPOSITION

TECHNICAL FIELD

The present invention relates to an adhesive composition. Priority is claimed on Japanese Patent Application No. 2020-040491, filed Mar. 10, 2020, the content of which is incorporated herein by reference.

BACKGROUND ART

An adhesive composition containing a polyvalent metal and a thermoplastic resin having at least one type of functional group selected from the group consisting of an amino group and salts thereof has been proposed as an adhesive composition that exhibits little rise in adhesive strength (Patent Document 1).

PRIOR ART LITERATURE

Patent Document

Patent Document 1: Japanese Unexamined Patent Application, First Publication No. 2017-66231

SUMMARY OF INVENTION

Problems to be Solved by the Invention

When adherends are bonded together using an adhesive composition, for example, when a decorative sheet such as a wallpaper is affixed to a wall material or panel, the bonding location may sometimes deviate from the desired position, and therefore the adhesive composition requires a satisfactory degree of adhesive strength, but also the ability to undergo bonding adjustment.

However, the adhesive composition of Patent Document 1 still exhibits a considerable rise in adhesive strength following bonding to an adherend, meaning bonding adjustment is sometimes difficult.

The present invention has an object of providing an adhesive composition which exhibits little rise in adhesive strength following bonding, making bonding adjustment easy.

Means for Solving the Problems

The present invention includes the following aspects.

[1] An adhesive composition containing a block copolymer composed of a polymer block A which includes a (meth)acrylate ester unit having a linear or branched side chain of 1 to 8 carbon atoms and has a number average molecular weight of 2,000 to 10,000, a polymer block B which includes at least one of an aromatic vinyl compound unit and a (meth)acrylate ester unit having a cyclic structure, and a polymer block C which includes a (meth)acrylate ester unit having a linear or branched side chain of 1 to 8 carbon atoms, wherein
the mass ratio (B/C) between the polymer block B and the polymer block C is within a range from 5.0/95.0 to 30.0/70.0,
the mass ratio (A/(B+C)) between the polymer block A and the total of the polymer block B and the polymer block C is within a range from 0.1/99.9 to 5.0/95.0, and
the acid value of the block copolymer is at least 8 mgKOH/g.

[2] The adhesive composition according to [1], wherein the block copolymer is represented by A-B-C-B-A or A-B-C-B (wherein A represents the polymer block A, B represents the polymer block B, and C represents the polymer block C).

[3] The adhesive composition according to [1] or [2], wherein the polymer block B includes a carboxyl group-containing monomer unit.

Effects of the Invention

The adhesive composition according to the aspects described above exhibits little rise in adhesive strength following bonding, making bonding adjustment easy.

EMBODIMENTS FOR CARRYING OUT THE INVENTION

The present invention is described below is further detail.
In the present invention, the term "(meth)acrylate ester" is a generic term for acrylate ester and methacrylate ester. Further, "(meth)acrylic acid" is a generic term for acrylic acid and methacrylic acid.

In this description, reversible addition-fragmentation chain-transfer polymerization is referred to as "RAFT polymerization", and the chain transfer agent used in a RAFT polymerization is referred to as a "RAFT agent".

In this description, number average molecular weight is also referred to as "Mn", and weight average molecular weight is also referred to as "Mw". Mn and Mw values refer to polystyrene-equivalent values measured by gel permeation chromatography (GPC) relative to standard polystyrenes.

The "acid value" of the block copolymer describes the number of mg of potassium hydroxide required to neutralize the acid contained within 1 g of the block copolymer, and is measured in accordance with JIS K 2501:2003.

In this description, the glass transition temperature is also referred to as "Tg".

The Tg value of the block copolymer (or the Tg value of a polymer block that constitutes part of the block copolymer) is determined from the Fox equation represented by formula (i) shown below.

$$1/(Tg_P+273.15) = \Sigma[W_i/(Tg_i+273.15)] \quad (i)$$

In formula (i), $Tg_P$ is the Tg value (° C.) of the block copolymer (or the polymer block), $W_m$ is the mass fraction of a monomer (hereafter also referred to as "the monomer m") that constitutes part of the block copolymer (or polymer block), and $Tg_m$ is the Tg value (° C.) of a homopolymer of the monomer m.

$Tg_m$ is widely known as a characteristic value of a homopolymer, and for example, the value disclosed in the "Polymer Handbook, Third Edition" or the catalog value from the manufacturer may be used. The Tg value of the block copolymer (or polymer block) can be adjusted by altering the variety and mass fraction of the various monomers m.

The adhesive composition according to one aspect of the present invention contains a specific block copolymer (hereafter also referred to as "the block copolymer X").

<Block Copolymer X>

The block copolymer X is composed of a polymer block A, a polymer block B, and a polymer block C. The number of each of the polymer blocks A, B and C within the block copolymer X may be 1, or 2 or greater.

The polymer block A includes a (meth)acrylate ester unit having a linear or branched side chain of 1 to 8 carbon atoms, and has an Mn value of 2,000 to 10,000.

The polymer block B includes at least one of an aromatic vinyl compound unit and a (meth)acrylate ester unit having a cyclic structure.

The polymer block C includes a (meth)acrylate ester unit having a linear or branched side chain of 1 to 8 carbon atoms.

The block copolymer X has an acid value, and at least one of the polymer blocks A, B and C has an acid value. The polymer block having an acid value includes an acid component (such as a carboxyl group-containing monomer unit).

Each of the polymer blocks is described below in further detail.

The block copolymer X is preferably a block copolymer represented by A-(B-C)$_n$-B-A or A-(B-C)$_n$-B, wherein A represents the polymer block A, B represents the polymer block B, C represents the polymer block C, an n represents an integer of 1 or greater.

By ensuring that the polymer block A exists at at least one terminal of the block copolymer X, any rise in adhesive strength following bonding can be kept small. Further, by sandwiching the polymer block C between the polymer blocks B, microphase separation tends to occur more readily, further improving the creep characteristics.

If consideration is given to the ease of production of the block copolymer X, the value of n is preferably 1 or 2, and 1 is particularly preferred. In other words, it is particularly preferable that the block copolymer X is a block copolymer represented by A-B-C-B-A or A-B-C-B.

The mass ratio (B/C) between the polymer block B and the polymer block C is within a range from 5.0/95.0 to 30.0/70.0, preferably within a range from 8.0/92.0 to 29.0/71.0, and more preferably within a range from 10.0/90.0 to 28.0/72.0. Provided B/C is at least 5.0/95.0, the creep characteristics are excellent, and provided B/C is not higher than 30.0/70.0, the adhesive strength is excellent.

The mass ratio (A/(B+C)) between the polymer block A and the total of the polymer block B and the polymer block C is within a range from 0.1/99.9 to 5.0/95.0, preferably within a range from 0.2/99.8 to 4.9/95.1, and more preferably within a range from 0.3/99.7 to 4.8/95.2. Provided (A/(B+C)) is at least 0.1/99.9, the wetting characteristics are excellent and the rise in adhesive strength following bonding is small, whereas provided (A/(B+C)) is not higher than 5.0/95.0, the creep characteristics are excellent.

The acid value of the block copolymer X is at least 8 mgKOH/g, and is preferably 13 mgKOH/g or higher. Provided the acid value of the block copolymer X is at least 8 mgKOH/g, pseudo crosslinked structures are generated more readily, and the creep characteristics are excellent.

From the viewpoint of storage stability, the acid value of the block copolymer X is preferably not more than 50 mgKOH/g, and is more preferably 41 mgKOH/g or lower.

The lower limit and upper limit for the above acid value may be combined as appropriate. For example, the acid value of the block copolymer X may be at least 8 mgKOH/g but not more than 50 mgKOH/g, or may be at least 13 mgKOH/g but not more than 41 mgKOH/g.

Because the polymer blocks B are proximate to one another due to microphase separation, at least a portion of the acid value of the block copolymer X is preferably derived from the polymer block B. The proportion of the acid value (mgKOH/g) of the block copolymer X that is derived from the acid value (mgKOH/g) of the polymer block B, expressed as a percentage relative to a value of 100% of the acid value of the block copolymer X, is preferably at least 97%, and is more preferably 100%. In other words, it is particularly preferable that all of the acid value of the block copolymer X is derived from the polymer block B.

The proportion of the acid value (mgKOH/g) of the block copolymer X that is derived from the acid value (mgKOH/g) of the polymer block A or C, expressed as a percentage relative to a value of 100% of the acid value of the block copolymer X, is preferably not more than 3%, and is more preferably 0%.

A determination as to which polymer block the acid value of the block copolymer X is derived from can be made on the basis of the amount of acid components (such as carboxyl group-containing monomer units) included within each polymer block. For example, in those cases where the polymer block B includes an acid component, but the polymer blocks A and C do not include an acid component, it can be concluded that all of the acid value of the block copolymer X is derived from the polymer block B. Further, in those cases where the polymer blocks B and C include an acid component, but the polymer block A does not include an acid component, the mass ratio between the acid component included in the polymer block B and the acid component included in the polymer block A, with the total amount of all the acid components deemed to be 100% by mass, determines the ratio between the acid value derived from the polymer block B and the acid value derived from the polymer block A within the total acid value of the block copolymer X.

The Mw value of the block copolymer X is preferably within a range from 100,000 to 1,000,000, and is more preferably from 200,000 to 600,000. When Mw is at least 100,000, and particularly 200,000 or greater, the creep characteristics are particularly superior, and provided Mw is not more than 1,000,000, and particularly 600,000 or less, the coating characteristics are more superior.

The dispersity (Mw/Mn) of the block copolymer X is preferably within a range from 1.5 to 6.0, and more preferably from 2.1 to 5.3.

(Polymer Block A)

The polymer block A includes a unit of a (meth)acrylate ester (hereafter referred to as "monomer a1") having a linear or branched side chain of 1 to 8 carbon atoms.

Examples of the side chain of the monomer a1 include an alkyl chain or an alkoxyalkyl chain.

The number of carbon atoms in the side chain is from 1 to 8, and is preferably from 4 to 8. Provided the number of carbon atoms in the side chain is at least 1, the wetting characteristics of the adhesive composition on the adherend are excellent, and provided the number of carbon atoms is not more than 8, satisfactory adhesiveness is more easily obtained. Form the viewpoint of the adhesive strength, the side chain is preferably linear.

Specific examples of the monomer a1 include alkyl (meth)acrylate esters such as methyl (meth)acrylate, ethyl (meth)acrylate, n-butyl (meth)acrylate, isobutyl (meth)acrylate, and 2-ethylhexyl (meth)acrylate; and alkoxyalkyl (meth)acrylate esters such as 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl acrylate, and 2-(n-butoxy) propyl (meth)acrylate. One of these monomers may be used alone, or a combination of two or more monomers may be used. For example, a combination of a monomer having a side chain of 1 to 3 carbon atoms and a monomer having a side chain of 4 to 8 carbon atoms may be used. Further, a combination of a monomer having a linear side chain and a monomer having a branched side chain may be used.

The polymer block A may, if necessary, also include another monomer unit besides the monomer a1.

Examples of monomers besides the monomer a1 include (meth)acrylate esters having a linear or branched side chain of 9 or more carbon atoms, and carboxyl group-containing monomers. Examples of the carboxyl group-containing monomers include the carboxyl group-containing monomers exemplified below in the description of the polymer block B. One of these monomers may be used alone, or a combination of two or more monomers may be used.

The proportion of monomer a1 units, relative to a total of 100% by mass of all of the monomer units that constitute the polymer block A, is preferably at least 70% by mass, more preferably at least 85% by mass, and may be 100% by mass.

The proportion of monomer units besides the monomer a1, relative to a total of 100% by mass of all of the monomer units that constitute the polymer block A, is preferably not more than 30% by mass, more preferably not more than 15% by mass, and may be 0% by mass.

The polymer block A may include, relative to a total of 100% by mass of all of the monomer units that constitute the polymer block A, 70 to 100% by mass of monomer a1 units, and 0 to 30% by mass of monomer units besides the monomer a1, or may include 85 to 100% by mass of monomer a1 units, and 0 to 15% by mass of monomer units besides the monomer a1. A proportion of 0% by mass of monomer units besides the monomer a1 indicates that the polymer block contains no monomer units besides the monomer a1.

The Mn value of the polymer block A is within a range from 2,000 to 10,000, and is preferably from 3,000 to 8,000. Provided Mn of the polymer block A is at least 2,000, the creep characteristics are excellent, and provided Mn is not more than 10,000, any rise in adhesive strength is small, and the adhesion characteristics are less likely to deteriorate at low temperatures.

The dispersity (Mw/Mn) of the polymer block A is preferably within a range from 1.0 to 2.0, and more preferably from 1.0 to 1.5.

The Tg value of the polymer block A is preferably −30° C. or lower, and more preferably −50° C. or lower. Provided Tg of the polymer block A is −30° C. or lower, the adhesive strength is more superior.

Although there are no particular limitations on the lower limit for Tg of the polymer block A, a typical value is −70° C. For example, Tg of the polymer block A may be within a range from −70° C. to −30° C., or may be from −70° C. to −50° C.

(Polymer Block B)

The polymer block B includes at least one of a unit of an aromatic vinyl compound (hereafter also referred to as "monomer b1") and a unit of a (meth)acrylate ester having a cyclic structure (hereafter also referred to as "monomer b2"). Among the monomer b1 and the monomer b2, the polymer block B may contain only units of the monomer b1, only units of the monomer b2, or may contain both units.

Examples of the monomer b1 include styrene, α-methylstyrene, o-, m- or p-methylstyrene, and o-, m- or p-chlorostyrene.

Examples of the monomer b2 include (meth)acrylate esters having an aromatic cyclic structure such as benzyl (meth)acrylate and 2-phenoxyethyl (meth)acrylate; and (meth)acrylate esters having an alicyclic structure such as cyclohexyl (meth)acrylate, dicyclopentanyl (meth)acrylate, and isobornyl (meth)acrylate.

One of these monomers may be used alone, or a combination of two or more monomers may be used.

Among the monomer b1 and the monomer b2, in terms of making it easier for the block copolymer X to undergo microphase separation, the monomer b1 is preferred, and styrene is particularly desirable.

The polymer block B may, if necessary, also include another monomer unit besides the monomer b1 and the monomer b2.

Examples of monomers besides the monomer b1 and the monomer b2 include carboxyl group-containing monomers, monomers having a functional group other than a carboxyl group, alkyl (meth)acrylate esters, and alkoxyalkyl (meth)acrylate esters.

By including a carboxyl group-containing monomer unit in the polymer block B, hydrogen bonding between the carboxyl groups can cause the formation of pseudo crosslinked structures in the arrangement of the block copolymer, and therefore the viscoelasticity can be increased without the provision of crosslinked structures.

Examples of the carboxyl group-containing monomer include (meth)acrylic acid, β-carboxyethyl (meth)acrylate, carboxypentyl (meth)acrylate, itaconic acid, crotonic acid, maleic acid, and fumaric acid. One of these monomers may be used alone, or a combination of two or more monomers may be used.

By including a monomer unit having a functional group other than a carboxyl group in the polymer block B, crosslinked structures can be provided by curing agents having an isocyanate group or epoxy group.

Examples of the functional group other than a carboxyl group include a hydroxyl group or the like.

Examples of monomers having a hydroxyl group include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate. One of these monomers may be used alone, or a combination of two or more monomers may be used.

Examples of the alkyl (meth)acrylate esters include methyl (meth)acrylate, ethyl (meth)acrylate, n-butyl (meth)acrylate, isobutyl (meth)acrylate, and 2-ethylhexyl (meth)acrylate.

Examples of the alkoxyalkyl (meth)acrylate esters include 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl acrylate, and 2-(n-butoxy)propyl (meth)acrylate. One of these monomers may be used alone, or a combination of two or more monomers may be used.

From the viewpoint of facilitating microphase separation, the proportion of the combined total of monomer b1 units and monomer b2 units, relative to a total of 100% by mass of all of the monomer units that constitute the polymer block B, is preferably at least 50% by mass, more preferably at least 80% by mass, and may be 100% by mass. Provided the proportion of the combined total of monomer b1 units and monomer b2 units is at least 50% by mass, the hydrophobicity of the polymer block B is high, and the block copolymer X can more readily adopt a microphase-separated structure.

In those cases where the polymer block B includes monomer units besides the units of the monomer b1 and the monomer b2, the proportion of the combined total of monomer b1 units and monomer b2 units, relative to a total of 100% by mass of all of the monomer units that constitute the polymer block B, is preferably not more than 96% by mass, and more preferably 89% by mass or less.

The lower limit and upper limit for the above proportion may be combined as appropriate. For example, in those cases where the polymer block B includes monomer units besides the units of the monomer b1 and the monomer b2, the proportion of the combined total of monomer b1 units and monomer b2 units, relative to a total of 100% by mass of all of the monomer units that constitute the polymer block B, may be within a range from 50 to 96% by mass, or may be from 80 to 89% by mass.

In those cases where the polymer block B includes a carboxyl group-containing monomer unit, the mass ratio within the polymer block B between the combined total of monomer b1 units and monomer b2 units, and the carboxyl group-containing monomer units (combined total of monomer b1 units and monomer b2 units/carboxyl group-containing monomer units) is preferably within a range from 85/15 to 96/4, and more preferably from 87/13 to 89/11. Provided this mass ratio 85/15 or higher, the block copolymer X can more readily adopt the pseudo crosslinked structures mentioned above, making the creep characteristics particularly superior. Provided this mass ratio is not more than 96/4, the hydrophobicity of the polymer block B is satisfactorily high, and the block copolymer X can readily adopt a microphase-separated structure.

In those cases where the polymer block B includes a monomer unit having a functional group other than a carboxyl group, the proportion of monomer units having a functional group other than a carboxyl group, relative to a total of 100% by mass of all of the monomer units that constitute the polymer block B, is preferably within a range from 0.5 to 10.0% by mass, and more preferably from 1.0 to 2.0% by mass.

The polymer block B may be a polymer block in which, relative to a total of 100% by mass of all of the monomer units that constitute the polymer block B, the combined total of monomer b1 units and monomer b2 units is within a range from 50 to 96% by mass, and the proportion of monomer units having a functional group other than a carboxyl group is within a range from 0.5 to 10.0% by mass, and in which the mass ratio between the combined total of monomer b1 units and monomer b2 units, and the carboxyl group-containing monomer units (combined total of monomer b1 units and monomer b2 units/carboxyl group-containing monomer units) is within a range from 85/15 to 96/4, or may be a polymer block in which, relative to a total of 100% by mass of all of the monomer units that constitute the polymer block B, the combined total of monomer b1 units and monomer b2 units is within a range from 80 to 89% by mass, and the proportion of monomer units having a functional group other than a carboxyl group is within a range from 1.0 to 2.0% by mass, and in which the mass ratio between the combined total of monomer b1 units and monomer b2 units, and the carboxyl group-containing monomer units (combined total of monomer b1 units and monomer b2 units/ carboxyl group-containing monomer units) is within a range from 87/13 to 89/11.

The Tg value of the polymer block B is preferably at least 75° C., more preferably at least 80° C., and even more preferably 90° C. or higher. Provided Tg of the polymer block B is at least 75° C., the creep characteristics are more superior.

Although there are no particular limitations on the upper limit for Tg of the polymer block B, a typical value is 200° C. For example, Tg of the polymer block B may be within a range from 75° C. to 200° C., may be from 80° C. to 200° C., or may be from 90° C. to 200° C.

(Polymer Block C)

The polymer block C includes a unit of a (meth)acrylate ester (hereafter also referred to as "monomer c1") having a linear or branched side chain of 1 to 8 carbon atoms.

Examples of the side chain of the monomer c1 include an alkyl chain or an alkoxyalkyl chain.

The number of carbon atoms in the side chain is from 1 to 8, and is preferably from 4 to 8. Provided the number of carbon atoms in the side chain is at least 1, microphase separation tends to occur more readily, and provided the number of carbon atoms is not more than 8, satisfactory adhesiveness is more easily realized.

From the viewpoint of the adhesive strength, the side chain is preferably linear. From the viewpoint of the coating characteristics, the side chain is preferably branched.

Specific examples of the monomer c1 include alkyl (meth)acrylate esters such as methyl (meth)acrylate, ethyl (meth)acrylate, n-butyl (meth)acrylate, isobutyl (meth)acrylate, and 2-ethylhexyl (meth)acrylate; and alkoxyalkyl (meth)acrylate esters such as 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl acrylate, and 2-(n-butoxy) propyl (meth)acrylate. One of these monomers may be used alone, or a combination of two or more monomers may be used. For example, a combination of a monomer having a side chain of 1 to 3 carbon atoms and a monomer having a side chain of 4 to 8 carbon atoms may be used. Further, a combination of a monomer having a linear side chain and a monomer having a branched side chain may be used.

The polymer block C may, if necessary, also include another monomer unit besides the monomer c1.

Examples of monomers besides the monomer c1 include (meth)acrylate esters having a linear or branched side chain of 9 or more carbon atoms, and carboxyl group-containing monomers. Examples of the carboxyl group-containing monomers include the carboxyl group-containing monomers exemplified above in the description of the polymer block B. One of these monomers may be used alone, or a combination of two or more monomers may be used.

The proportion of monomer c1 units, relative to a total of 100% by mass of all of the monomer units that constitute the polymer block C, is preferably at least 70% by mass, more preferably at least 85% by mass, and may be 100% by mass.

The proportion of monomer units besides the monomer c1, relative to a total of 100% by mass of all of the monomer units that constitute the polymer block C, is preferably not more than 30% by mass, more preferably not more than 15% by mass, and may be 0% by mass.

The polymer block C may include, relative to a total of 100% by mass of all of the monomer units that constitute the polymer block C, 70 to 100% by mass of monomer c1 units, and 0 to 30% by mass of monomer units besides the monomer c1, or may include 85 to 100% by mass of monomer c1 units, and 0 to 15% by mass of monomer units besides the monomer c1. A proportion of 0% by mass of monomer units besides the monomer c1 indicates that the polymer block contains no monomer units besides the monomer c1.

The Tg value of the polymer block C is preferably −30° C. or lower, and more preferably −50° C. or lower. Provided Tg of the polymer block C is −30° C. or lower, the adhesive strength is more superior.

Although there are no particular limitations on the lower limit for Tg of the polymer block C, a typical value is −70° C. For example, Tg of the polymer block C may be within a range from −70° C. to −30° C., or may be from −70° C. to −50° C.

(Method for Producing Block Copolymer X)

The block copolymer X can be produced, for example, by living polymerization.

Examples of living polymerization include living anionic polymerization and RAFT polymerization, and RAFT polymerization is preferred.

In RAFT polymerization, a RAFT agent and a polymerization initiator are used.

Examples of the RAFT agent include sulfur-based compounds such as dithio esters, dithiocarbamates, trithiocarbonates, and xanthates.

Examples of the polymerization initiator include azo-based polymerization initiators and peroxide-based polymerization initiators.

There are no particular limitations on the method used for the RAFT polymerization, and conventional methods may be employed, such as solution polymerization methods, emulsification polymerization methods, bulk polymerization methods, and suspension polymerization methods.

There are no particular limitations on the solvent used in the RAFT polymerization, and conventional solvents may be used.

The method for producing the block copolymer X is described below in further detail using an example in which RAFT polymerization is used to produce a block copolymer represented by A-B-C-B-A.

In the production method of this example, a monomer component a that includes the monomer a1 is polymerized in the presence of a polymerization initiator and a RAFT agent represented by formula (1) shown below to obtain the polymer block A, a monomer component b that includes at least one of the monomer b1 and the monomer b2 is polymerized in the presence of the obtained polymer block A to obtain a block copolymer Z represented by A-B-A, and a monomer component c that includes the monomer c1 is then polymerized in the presence of the obtained block copolymer Z to obtain a block copolymer represented by A-B-C-B-A.

The monomer component a may include another monomer besides the monomer a1. The monomer component b may include another monomer besides the monomer b1 and the monomer b2. The monomer component c may include another monomer besides the monomer c1.

At least one of the monomer components a, b and c typically includes a carboxyl group-containing monomer. It is preferable that at least the monomer component b includes a carboxyl group-containing monomer.

[Chemical formula 1]

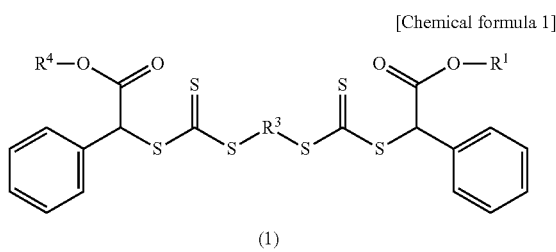

(1)

(In the formula, $R^1$ and $R^4$ each independently represent a hydrogen atom or an alkyl group of 1 to 6 carbon atoms, and $R^3$ represents a divalent organic group.)

The preferred proportion of the monomer a1 relative to 100% by mass of the entire monomer component a is the same as the preferred proportion of the monomer a1 units relative to a total of 100% by mass of all of the monomer units that constitute the polymer block A. This is also the case for any monomer besides the monomer a1.

The preferred proportion of the combined total of the monomer b1 and the monomer b2 relative to 100% by mass of the entire monomer component b is the same as the preferred proportion of the combined total of monomer b1 units and monomer b2 units relative to a total of 100% by mass of all of the monomer units that constitute the polymer block B. This is also the case for any monomer besides the monomer b1 and the monomer b2.

The preferred proportion of the monomer c1 relative to 100% by mass of the entire monomer component c is the same as the preferred proportion of the monomer c1 units relative to a total of 100% by mass of all of the monomer units that constitute the polymer block C. This is also the case for any monomer besides the monomer c1.

In formula (1), examples of the alkyl group for $R^1$ and $R^4$ include a methyl group, ethyl group, n-propyl group, isopropyl group, n-butyl group, isobutyl group, t-butyl group, pentyl group, and hexyl group.

$R^1$ and $R^4$ preferably independently each represent a hydrogen atom or a methyl group.

Examples of the divalent organic group for $R^3$ include alkylene groups and arylene groups. Further, $R^3$ may include an introduced optional substituent, and an optional divalent linking group may be introduced within the carbon chain of $R^3$.

Examples of the alkylene groups include a methylene group, ethylene group, propylene group, butylene group, pentylene group, hexylene group, heptylene group, octylene group, nonylene group, decylene group, undecylene group, and dodecylene group.

Examples of the arylene groups include a phenylene group and a naphthylene group. Examples of substituents which may be included in the arylene group include alkyl groups such as a methyl group.

Because the RAFT agent represented by formula (1) shown above has two reactive sites, polymerization of the monomer component a in the presence of this RAFT agent produces the polymer block A sandwiched on either end of a structure derived from the RAFT agent (S—C(=S)—S—$R^3$—S—C(=S)—S). By subsequently conducting further polymerization with the monomer component b, the polymer block B is grown between the structure derived from the RAFT agent and the polymer block A. By conducting further polymerization with the monomer component b, the polymer block C is grown between the structure derived from the RAFT agent and the polymer block B. Because the two central polymer blocks C are linked via the structure derived from a single molecule of the RAFT agent, they can be deemed to represent a single polymer block C.

Provided the RAFT agent has two reactive sites, a RAFT agent different from the RAFT agent represented by formula (1) can be used to produce the block copolymer in a similar manner to that described above. Further, in those cases where a RAFT agent having only one reactive site is used, the block copolymer can be produced by sequentially growing each polymer block (for example, sequentially growing A, B, C, B and A).

<Other Components>

The adhesive composition of one aspect of the present invention may, if necessary, also contain a liquid medium such as an organic solvent or water.

Further, if necessary, the adhesive composition of one aspect of the present invention may also contain additives such as ultraviolet absorbers, antioxidants, preservatives, antifungal agents, plasticizers, antifoaming agents, wettability modifiers, tackifiers, and curing agents, provided these additives do not impair the effects of the present invention.

From the viewpoint of ensuring favorable storage stability for the adhesive composition, the composition preferably does not contain any isocyanates or silane coupling agents.

The adhesive composition of an aspect of the present invention can be produced by producing the block copolymer X in the manner described above, and then adding a liquid medium and additives as required.

The adhesive composition of an aspect of the present invention has an adhesive strength measured using the measurement method described below in the examples (namely, adhesive strength determined by a 180° peel test) that is preferably at least 15 N/25 mm, and more preferably 18 N/25 mm or greater. Provided the adhesive strength is at least 15 N/25 mm, adherends can be bonded together with satisfactory strength. The upper limit for this adhesive strength is, for example, 25 N/25 mm.

Furthermore, the adhesive composition of an aspect of the present invention exhibits an adhesion increase (1 day) measured using the measurement method described below in the examples that is preferably not more than 1.5. The closer this adhesion increase is to 1, the smaller the rise in adhesive strength following bonding, and the easier bonding adjustment becomes.

<Actions and Effects>

Because the adhesive composition described above contains the block copolymer X composed of the polymer block A, the polymer block B and the polymer block C, any rise in adhesive strength following bonding is small, and bonding adjustment is easy. Further, the basic performance of the adhesive in terms of adhesive strength and creep characteristics are also favorable.

By including a (meth)acrylate ester unit having a linear or branched side chain of 1 to 8 carbon atoms in the polymer blocks A and C, favorable adhesive strength is achieved.

By including at least one of the monomer b1 unit and the monomer b2 unit in the polymer block B, a portion of the block copolymer X becomes hydrophobic, causing microphase separation. As a result of this microphase separation, the molecules of the block copolymer X adopt an arrangement in which the polymer blocks B are adjacent to one another. Further, because the block copolymer X has an acid value, pseudo crosslinked structures can be generated in the arrangement of the molecules of the block copolymer X. This results in an improvement in the creep characteristics.

Moreover, by ensuring that the Mn value of the polymer block A is within the specified range, the wettability of the adherend surface by the block copolymer X is excellent. As a result, it is thought that, following bonding, the adhesive strength is less likely to increase when the adherend is peeled to perform a bonding adjustment, meaning stable adhesion characteristics are achieved.

<Applications>

The adhesive composition of an aspect of the present invention can be used in a variety of applications.

The adhesive composition of an aspect of the present invention is particularly ideal in applications in which the adherends are not peeled apart after bonding, such as the case of adhesives used in bonding a decorative sheet such as a wallpaper to a wall material or panel. Examples of the material of the wall material or panel include aluminum, stainless steel, gypsum board, galvanized steel sheets, and resin-coated steel sheets. Examples of the material of the decorative sheet include vinyl chloride, polyethylene terephthalate, and olefins.

The adhesive composition of an aspect of the present invention is also ideal in applications in which peeling of the adherends is necessary, such as the case of adhesives used in securing a polishing pad used for polishing a glass substrate or single crystal or the like to an adherend. Examples of the adherend used include stainless steel and aluminum. Examples of the material of the polishing pad include polyurethane, epoxy resins, and polyimides and the like.

EXAMPLES

The present invention is described below in further detail using a series of examples, but the present invention is not limited to these examples.

<Measurements, Evaluations>

(Calculation of Tg)

The Tg values for the polymer blocks A, B and C, and the block copolymer were determined from the Fox equation represented by formula (i) shown above.

(Measurement of Molecular Weight)

The Mn and Mw values for the polymer block A and the block copolymer were measured by gel permeation chromatography (GPC) under the conditions listed below. The Mn and Mw values refer to polystyrene-equivalent values.

GPC Measurement Conditions:
  GPC apparatus: GPC-101 (manufactured by Shoko Co., Ltd.)
  Columns: Shodex A-806M columns×2, connected in series (manufactured by Showa Denko K.K.)
  Detector: Shodex RI-71 (manufactured by Showa Denko K.K.)
  Mobile phase: tetrahydrofuran
  Flow rate: 1 mL/minute (Measurement of Acid Value)

The acid value was measured in accordance with JIS K 2501:2003. Specifically, the acid value was measured by titration using a solution prepared by dissolving potassium hydroxide in methanol to achieve a concentration of 0.1 N.

(Measurement of Adhesive Strength)

The adhesive composition was applied to a polyethylene terephthalate (PET) film in an amount sufficient to yield a dried film thickness of 50 μm, and the composition was dried at 100° C. for 5 minutes to obtain a test piece having an adhesive layer on the PET film. The test piece was cut to a width of 25 mm. A plurality of the cut test pieces were placed on a stainless steel sheet with dimensions of 50 mm×150 mm with the surface of the adhesive layer facing the stainless steel sheet, and a 2 kg roller was rolled once back and forth across the test pieces to effect bonding.

Subsequently, following standing at room temperature (23° C.) and 50% RH for 20 minutes, or following standing at 60° C. for either one day or three days, the PET films of the test pieces bonded to the stainless steel sheet were measured for adhesive strength (N/25 mm), under an atmosphere at 23° C. and 50% RH, in accordance with section 8.3.1 "180° Peeling Method" of JIS Z 0237:2009. The adhesive strength is preferably at least 15 N/25 mm.

Based on the measured adhesive strength values, the adhesion increase (1 day, 3 days) was calculated using the formula shown below. A smaller adhesion increase indicates a smaller rise in the adhesive strength. The adhesion increase is preferably not more than 1.5.

Adhesion Increase (1 day)=$Q^2/Q^1$
Adhesion Increase (3 days)=$Q^3/Q^1$ $Q^1$ represents the adhesive strength (N/25 mm) measured after standing for 20 minutes, $Q^2$ represents the adhesive strength (N/25 mm) measured after standing for 1 day at 60° C., and $Q^3$ represents the adhesive strength (N/25 mm) measured after standing for 3 days at 60° C.

(Measurement of Shear Adhesive Strength)

The adhesive composition was applied, in an amount sufficient to yield a dried film thickness of 50 μm, to a PET film that had been surface-treated with a silicone, and the composition was dried at 100° C. for 5 minutes to obtain a test piece having an adhesive layer on the PET film. The test piece was cut to pieces having dimensions of 1 cm×1 cm. A plurality of the cut test pieces were placed on an aluminum foil sheet with dimensions of 30 mm×150 mm with the surface of the adhesive layer facing the aluminum foil sheet. The PET film was then peeled off each of the test pieces to expose the adhesive layer, a separate aluminum foil sheet with dimensions of 30 mm×150 mm was placed on top of the exposed adhesive layer, and a 2 kg roller was rolled once back and forth across the test pieces to effect bonding. Subsequently, under an atmosphere at 23° C. and 50% RH, a tension tester was used to pull the aluminum foil at a pull speed of 50 mm/min, and the maximum stress value was recorded as the shear adhesive strength (N/cm$^2$). The shear adhesive strength is preferably at least 100 N/cm$^2$.

(Evaluation of Heat-Resistant Creep Characteristics)

Test pieces were prepared in the same manner as that described for measurement of the adhesive strength.

In accordance with JIS Z 0237:2009, the test pieces were rolled once back and forth with a pressure roller from the side of the PET film, and then installed in a creep tester that had been adjusted to 40° C. Under an atmosphere at either 100° or 150° C., a 1 kg weight was affixed to the PET film, and the time taken for the PET film to drop from the stainless steel sheet was measured. In those cases where the PET film had not fallen from the stainless steel sheet even after one hour had elapsed, the displacement of the PET film (the distance moved from the position prior to starting the test) after one hour was measured. The drop time (minutes) or the displacement (mm) was used as an indicator of the heat-resistance creep characteristics, with a smaller displacement (mm) meaning superior heat-resistance creep characteristics. In those cases where the PET dropped from the stainless steel sheet, a longer drop time (minutes) means superior heat-resistance creep characteristics.

A displacement of not more than 1 mm was deemed a passing grade, and an evaluation was made against the following evaluation criteria.

○: passing grade achieved under atmospheres at 100° C. and 150° C.
Δ: passing grade achieved under atmosphere at 100° C., but failing grade at 150° C.
x: failing grade under atmosphere at 100° C.

Example 1

(1-1. Production of Polymer Block A)

A two-neck flask was charged with 100.0 g of n-butyl acrylate (BA), 4.54 g of the RAFT agent (1) and 0.05 g of 2,2'-azobis(2-methylbutyronitrile) (ABN-E), and the inside of the flask was flushed with nitrogen gas while the temperature was raised to 80° C. Subsequently, a polymerization reaction was conducted by stirring the contents at 80° C. for two hours (first stage reaction).

Following completion of the reaction, 4,000 g of n-hexane was added to the flask and stirred to precipitate the reaction product, the unreacted monomer (BA) and RAFT agent (1) were removed by filtration, and the reaction product was dried under reduced pressure at 70° C. to obtain a copolymer (polymer block A).

The Tg, Mn, Mw and Mw/Mn values for the thus obtained copolymer (polymer block A) are shown in Table 1.

(1-2. Production of Block Copolymer Z1)

A two-neck flask was charged with a mixture composed of 87.0 g of styrene (St), 1.0 g of 2-hydroxyethyl acrylate (HEA), 12.0 g of acrylic acid (AA), 0.19 g of ABN-E and 26.3 g of ethyl acetate, together with the copolymer (polymer block A) obtained above, and the inside of the flask was flushed with nitrogen gas while the temperature was raised to 85° C. Subsequently, a polymerization reaction was conducted by stirring the contents at 85° C. for 15 hours (second stage reaction), thus obtaining a reaction solution containing a block copolymer Z1 formed from a polymer block A and a polymer block B. The blend amounts of the mixture and the copolymer (polymer block A) were adjusted so that the mass ratio between the polymer block A and the polymer block B in the obtained block copolymer Z1 was 1/10.

Following completion of the reaction, 4,000 g of n-hexane was added to the flask and stirred to precipitate the reaction product, the unreacted monomers (St, HEA, AA) and the solvent were removed by filtration, and the reaction product was dried under reduced pressure at 70° C. to obtain the block copolymer Z1.

The Tg value for the polymer block B of the thus obtained block copolymer Z1 is shown in Table 1.

(1-3. Production of Block Copolymer X1)

A two-neck flask was charged with a mixture composed of 48.5 g of butyl acrylate (BA), 48.5 g of 2-ethylhexyl acrylate (2-EHA), 3.0 g of acrylic acid (AA), 0.05 g of ABN-E and 73.2 g of ethyl acetate, together with the block copolymer Z1 obtained above, and the inside of the flask was flushed with nitrogen gas while the temperature was raised to 85° C. Subsequently, a polymerization reaction was conducted by stirring the contents at 85° C. for 6 hours (third stage reaction), thus obtaining a reaction solution containing a block copolymer X1 formed from a polymer block A, a polymer block B and a polymer block C. The blend amounts of the mixture and the block copolymer Z1 were adjusted so that the mass ratio between the polymer block A, the polymer block B and the polymer block C in the obtained block copolymer X1 was 1/10/89.

A portion of the reaction solution was sampled, 4,000 g of n-hexane was added to the sample and stirred to precipitate the reaction product, the unreacted monomers (BA, 2-EHA, AA) and the solvent were removed by filtration, and the reaction product was dried under reduced pressure at 70° C. to obtain the block copolymer X1.

The Tg value for the polymer block C of the thus obtained block copolymer X1, and the Mn, Mw, Mw/Mn and acid value for the block copolymer Z1 are shown in Table 1.

Further, using the obtained reaction solution containing the block copolymer X1 as an adhesive composition, the adhesive strength, the shear adhesive strength and the heat-resistant creep characteristics were evaluated. The results are shown in Table 1. In Table 1, the entry "Creep" means the heat-resistant creep characteristics (this also applies to subsequent tables).

Examples 2 to 9, Comparative Examples 1 to 3

With the exceptions of altering the monomer compositions that constitute the polymer block A, the polymer block B and the polymer block C as shown in Tables 1 to 3, altering the polymerization conditions for the first stage reaction, the second stage reaction and the third stage reaction as shown in Tables 1 to 3, and altering the mass ratio (A/B/C) between the polymer block A, the polymer block B and the polymer block C as shown in Tables 1 to 3, block copolymers X2 to X12 were produced in the same manner as Example 1, and the various measurements were performed. The results are shown in Tables 1 to 3.

Comparative Example 4

(4-1. Production of Polymer Block B)

A two-neck flask was charged with 87.0 g of styrene (St), 1.0 g of 2-hydroxyethyl acrylate (HEA), 12.0 g of acrylic acid (AA), 0.5 g of the RAFT agent (1) and 0.2 g of 2,2'-azobis(2-methylbutyronitrile) (ABN-E), and the inside of the flask was flushed with nitrogen gas while the temperature was raised to 80° C. Subsequently, a polymerization reaction was conducted by stirring the contents at 80° C. for 6 hours (first stage reaction).

Following completion of the reaction, 4,000 g of n-hexane was added to the flask and stirred to precipitate the reaction product, the unreacted monomers (St, HEA, AA) and RAFT agent (1) were removed by filtration, and the reaction product was dried under reduced pressure at 70° C. to obtain a copolymer (polymer block B).

The Tg value for the thus obtained copolymer (polymer block B) is shown in Table 4.

(4-2. Production of Block Copolymer X13)

A two-neck flask was charged with a mixture composed of 48.5 g of butyl acrylate (BA), 48.5 g of 2-ethylhexyl acrylate (2-EHA), 3.0 g of acrylic acid (AA), 0.0282 g of ABN-E and 73.5 g of ethyl acetate, together with the copolymer (polymer block B) obtained above, and the inside of the flask was flushed with nitrogen gas while the temperature was raised to 85° C. Subsequently, a polymerization reaction was conducted by stirring the contents at 85° C. for 15 hours (second stage reaction), thus obtaining a reaction solution containing a block copolymer X13 formed from a polymer block B and a polymer block C. The blend amounts of the mixture and the copolymer (polymer block B) were adjusted so that the mass ratio between the polymer block B and the polymer block C in the obtained block copolymer X13 was 11/89.

A portion of the reaction solution was sampled, 4,000 g of n-hexane was added to the sample and stirred to precipitate the reaction product, the unreacted monomers (BA, 2-EHA, AA) and the solvent were removed by filtration, and the reaction product was dried under reduced pressure at 70° C. to obtain the block copolymer X13.

The Tg value for the polymer block C of the thus obtained block copolymer X13, and the Mn, Mw, Mw/Mn and acid value for the block copolymer X13 are shown in Table 4.

Further, using the obtained reaction solution containing the block copolymer X13 as an adhesive composition, the adhesive strength, the shear adhesive strength and the heat-resistant creep characteristics were evaluated. The results are shown in Table 4.

Comparative Examples 5 to 7

With the exceptions of altering the monomer compositions that constitute the polymer block B and the polymer block C as shown in Table 4, altering the polymerization conditions for the first stage reaction and the second stage reaction as shown in Table 4, and altering the mass ratio (B/C) between the polymer block B and the polymer block C as shown in Table 4, block copolymers X14 to X16 were produced in the same manner as Comparative Example 4, and the various measurements were performed. The results are shown in Table 4.

Comparative Example 8

A two-neck flask was charged 8.8 g of styrene (St), 44.1 g of 2-ethylhexyl acrylate (2-EHA), 3.0 g of acrylic acid (AA), 0.05 g of 2,2'-azobis(2-methylbutyronitrile) (ABN-E) and 40 g of ethyl acetate, and the inside of the flask was flushed with nitrogen gas while the temperature was raised to 85° C. Subsequently, a polymerization reaction was conducted by stirring the contents at 85° C. for 10 hours, thus obtaining a reaction solution containing a random copolymer.

A portion of the reaction solution was sampled, 4,000 g of n-hexane was added to the sample in a flask and stirred to precipitate the reaction product, and the random copolymer was extracted from the reaction solution by removing the unreacted monomers (St, 2-EHA, AA) and the solvent by filtration, and then drying the reaction product under reduced pressure at 70° C.

The Mn, Mw, Mw/Mn and acid value for the obtained random copolymer are shown in Table 4.

Further, using the obtained reaction solution containing the random copolymer as an adhesive composition, the adhesive strength, the shear adhesive strength and the heat-resistant creep characteristics were evaluated. The results are shown in Table 4.

TABLE 1

|  |  |  | Example 1 | Example 2 | Example 3 | Example 4 |
|---|---|---|---|---|---|---|
| Polymer block A | Monomer composition [g] | BA | 100 | 100 | 100 | 100 |
|  |  | 2-EHA |  |  |  |  |
|  | Polymerization conditions [g] | ABN-E | 0.05 | 0.05 | 0.05 | 0.075 |
|  |  | RAFT agent (1) | 4.54 | 4.54 | 4.54 | 11.32 |
|  |  | RAFT agent (2) |  |  |  |  |

TABLE 1-continued

|  |  |  | Example 1 | Example 2 | Example 3 | Example 4 |
|---|---|---|---|---|---|---|
| Polymer block B | | Tg [° C.] | −54 | −54 | −54 | −54 |
| | | Mn | 5,000 | 5,000 | 5,000 | 1,700 |
| | | Mw | 6,000 | 6,000 | 6,000 | 2,260 |
| | | Mw/Mn | 1.19 | 1.19 | 1.19 | 1.33 |
| | Monomer composition [g] | St | 87 | 87 | 87 | 87 |
| | | HEA | 1 | 1 | 1 | 1 |
| | | AA | 12 | 12 | 12 | 12 |
| | | BA | | | | |
| | | 2-EHA | | | | |
| | Polymerization conditions [g] | Ethyl acetate | 26.3 | 26.3 | 26.3 | 11.3 |
| | | RAFT agent (1) | 4.54 | 4.54 | 4.54 | 2.03 |
| | | RAFT agent (2) | | | | |
| | | ABN-E | 0.19 | 0.19 | 0.19 | 0.19 |
| | | St/AA | 87.9/12.1 | 87.9/12.1 | 87.9/12.1 | 87.9/12.1 |
| Polymer block C | | Tg [° C.] | 103.7 | 103.7 | 103.7 | 103.7 |
| | Monomer composition [g] | BA | 48.5 | 40 | 48.5 | 40 |
| | | 2-EHA | 48.5 | 40 | 48.5 | 40 |
| | | MA | | 20 | | 20 |
| | | St | | | | |
| | | HEA | | | | |
| | | AA | 3 | | 3 | |
| | Polymerization conditions [g] | Ethyl acetate | 73.2 | 76.5 | 73.2 | 82.9 |
| | | ABN-E | 0.05 | 0.05 | 0.0118 | 0.0232 |
| | | Tg [° C.] | −62.5 | −57 | −57 | −57 |
| Block copolymer X | | A/B/C | 0.5/10.4/89.1 | 0.7/14.3/85.0 | 1.3/25.1/73.6 | 0.3/13.6/86.2 |
| | | A/B + C | 0.5/99.5 | 0.7/99.3 | 1.3/98.7 | 0.3/99.7 |
| | | B/C | 10/90 | 14/86 | 25/75 | 14/86 |
| | | Mn | 100,000 | 160,000 | 150,000 | 112,000 |
| | | Mw | 530,000 | 500,000 | 485,000 | 354,000 |
| | | Mw/Mn | 5.3 | 3.1 | 3.2 | 3.2 |
| | | Acid value [mgKOH/g] | 30.1 | 13.1 | 40.7 | 13.1 |
| Evaluations | Adhesive strength | 20 min [N/25 mm] | 16.7 | 21.2 | 15.1 | 16.5 |
| | | 60° C. 1 day [N/25 mm] | 18.0 | 23.8 | 15.5 | 18.2 |
| | | 60° C. 3 days [N/25 mm] | 20.2 | 27.5 | 15.8 | 19.8 |
| | | Adhesion increase (1 day) | 1.1 | 1.1 | 1.0 | 1.1 |
| | | Adhesion increase (3 days) | 1.2 | 1.3 | 1.0 | 1.2 |
| | Shear adhesive strength | | 100.8 | 130.0 | 114.9 | 115.9 |
| | Creep | 100° C. × 1 kg | ○ | ○ | ○ | ○ |

TABLE 2

|  |  |  | Example 5 | Example 6 | Example 7 | Example 8 |
|---|---|---|---|---|---|---|
| Polymer block A | Monomer composition [g] | BA | 100 | 100 | 100 | 100 |
| | | 2-EHA | | | | |
| | Polymerization conditions [g] | ABN-E | 0.05 | 0.05 | 0.05 | 0.05 |
| | | RAFT agent (1) | 2.26 | 4.54 | 4.54 | 4.54 |
| | | RAFT agent (2) | | | | |
| | | Tg [° C.] | −54 | −54 | −54 | −54 |
| | | Mn | 8,000 | 7,500 | 5,000 | 5,000 |
| | | Mw | 9,040 | 9,600 | 6,000 | 6,000 |
| | | Mw/Mn | 1.13 | 1.28 | 1.19 | 1.19 |
| Polymer block B | Monomer composition [g] | St | 87 | 87 | 87 | 87 |
| | | HEA | 1 | 1 | 1 | 1 |
| | | AA | 12 | 12 | 12 | 12 |
| | | BA | | | | |
| | | 2-EHA | | | | |
| | Polymerization conditions [g] | Ethyl acetate | 19.4 | 26.3 | 26.3 | 26.3 |
| | | RAFT agent (1) | 10.11 | 4.54 | 4.54 | 4.54 |
| | | RAFT agent (2) | | | | |
| | | ABN-E | 0.19 | 0.19 | 0.19 | 0.19 |
| | | St/AA | 87.9/12.1 | 87.9/12.1 | 87.9/12.1 | 87.9/12.1 |
| | | Tg [° C.] | 103.7 | 103.7 | 103.7 | 103.7 |
| Polymer block C | Monomer composition [g] | BA | 40 | 48.5 | 48.5 | 40 |
| | | 2-EHA | 40 | 48.5 | 48.5 | 40 |
| | | MA | 20 | | | 20 |
| | | St | | | | |
| | | HEA | | | | |
| | | AA | | 3 | 3 | |
| | Polymerization conditions [g] | Ethyl acetate | 76.3 | 73.2 | 76.3 | 76.3 |
| | | ABN-E | 0.0232 | 0.05 | 0.05 | 0.0232 |
| | | Tg [° C.] | −57 | −62.5 | −62.5 | −57 |

TABLE 2-continued

|  |  |  | Example 5 | Example 6 | Example 7 | Example 8 |
|---|---|---|---|---|---|---|
| Block copolymer X | | A/B/C | 1.5/15.3/83.1 | 4.8/14.0/81.2 | 0.8/5.5/93.7 | 1.4/27.7/70.9 |
| | | A/B + C | 1.5/98.5 | 4.8/95.2 | 0.8/99.2 | 1.4/98.6 |
| | | B/C | 15/85 | 15/85 | 5/95 | 28/72 |
| | | Mn | 169,000 | 150,000 | 182,000 | 106,000 |
| | | Mw | 453,000 | 400,000 | 550,000 | 227,000 |
| | | Mw/Mn | 2.7 | 2.7 | 3.0 | 2.1 |
| | | Acid value [mgKOH/g] | 14.0 | 30.1 | 26.6 | 26.2 |
| Evaluations | Adhesive strength | 20 min [N/25 mm] | 16.4 | 15.5 | 16.2 | 16.4 |
| | | 60° C. 1 day [N/25 mm] | 16.9 | 16.1 | 17.0 | 17.1 |
| | | 60° C. 3 days [N/25 mm] | 17.3 | 16.2 | 17.3 | 17.3 |
| | | Adhesion increase (1 day) | 1.0 | 1.0 | 1.0 | 1.0 |
| | | Adhesion increase (3 days) | 1.1 | 1.0 | 1.1 | 1.1 |
| | | Shear adhesive strength | 149.8 | 105.0 | 109.2 | 102.0 |
| | Creep | 100° C. × 1 kg | o | o | o | o |

TABLE 3

|  |  |  | Example 9 | Comparative Example 1 | Comparative Example 2 | Comparative Example 3 |
|---|---|---|---|---|---|---|
| Polymer block A | Monomer composition [g] | BA | | 100 | 100 | 100 |
| | | 2-EHA | 100 | | | |
| | Polymerization conditions [g] | ABN-E | 0.05 | 0.05 | 0.05 | 0.05 |
| | | RAFT agent (1) | 4.54 | 4.54 | 4.54 | 4.54 |
| | | RAFT agent (2) | | | | |
| | | Tg [° C.] | −70 | −54 | −54 | −54 |
| | | Mn | 5,000 | 35,000 | 5,000 | 5,000 |
| | | Mw | 6,000 | 40,000 | 6,000 | 6,000 |
| | | Mw/Mn | 1.19 | 1.28 | 1.19 | 1.19 |
| Polymer block B | Monomer composition [g] | St | 87 | 87 | 87 | 87 |
| | | HEA | 1 | 1 | 1 | 1 |
| | | AA | 12 | 12 | 12 | 12 |
| | | BA | | | | |
| | | 2-EHA | | | | |
| | Polymerization conditions [g] | Ethyl acetate | 26.3 | 26.3 | 26.3 | 26.3 |
| | | RAFT agent (1) | 4.54 | 4.54 | 4.54 | 4.54 |
| | | RAFT agent (2) | | | | |
| | | ABN-E | 0.19 | 0.19 | 0.19 | 0.19 |
| | | St/AA | 87.9/12.1 | 87.9/12.1 | 87.9/12.2 | 87.9/12.3 |
| | | Tg [° C.] | 103.7 | 103.7 | 103.7 | 103.7 |
| Polymer block C | Monomer composition [g] | BA | 40 | 48.5 | 40 | 48.5 |
| | | 2-EHA | 40 | 48.5 | 40 | 48.5 |
| | | MA | 20 | | 20 | |
| | | St | | | | |
| | | HEA | | | | |
| | | AA | | 3 | | 3 |
| | Polymerization conditions [g] | Ethyl acetate | 76.3 | 73.2 | 73.2 | 73.2 |
| | | ABN-E | 0.0232 | 0.05 | 0.05 | 0.05 |
| | | Tg [° C.] | −57 | −62.5 | −62.5 | −62.5 |
| Block copolymer X | | A/B/C | 0.8/15.3/83.9 | 6.5/13.0/80.8 | 1.1/3.9/95.0 | 0.7/31.1/68.2 |
| | | A/B + C | 0.8/99.2 | 6.5/93.5 | 1.1/98.9 | 0.7/99.3 |
| | | B/C | 15/85 | 15/85 | 4/96 | 32/68 |
| | | Mn | 164,000 | 160,000 | 283,000 | 160,000 |
| | | Mw | 498,000 | 425,000 | 530,000 | 360,000 |
| | | Mw/Mn | 3.0 | 2.7 | 1.9 | 2.3 |
| | | Acid value [mgKOH/g] | 14.0 | 30.1 | 3.7 | 45.6 |
| Evaluations | Adhesive strength | 20 min [N/25 mm] | 19.7 | 13.2 | 14.8 | 11.3 |
| | | 60° C. 1 day [N/25 mm] | 21.9 | 14.4 | 15.8 | 18.2 |
| | | 60° C. 3 days [N/25 mm] | 22.6 | 15.4 | 16.3 | 20.8 |
| | | Adhesion increase (1 day) | 1.1 | 1.1 | 1.1 | 1.6 |
| | | Adhesion increase (3 days) | 1.1 | 1.2 | 1.1 | 1.8 |
| | | Shear adhesive strength | 109.0 | 84.0 | 53.2 | 256.2 |
| | Creep | 100° C. × 1 kg | o | x | o | o |

TABLE 4

|  |  |  | Comparative Example 4 | Comparative Example 5 | Comparative Example 6 | Comparative Example 7 | Comparative Example 8 |
|---|---|---|---|---|---|---|---|
| Polymer block A | Monomer composition [g] | BA |  |  |  |  |  |
|  |  | 2-EHA |  |  |  |  |  |
|  | Polymerization conditions [g] | ABN-E |  |  |  |  |  |
|  |  | RAFT agent (1) |  |  |  |  |  |
|  |  | RAFT agent (2) |  |  |  |  |  |
|  |  | Tg [° C.] |  |  |  |  |  |
|  |  | Mn |  |  |  |  |  |
|  |  | Mw |  |  |  |  |  |
|  |  | Mw/Mn |  |  |  |  |  |
| Polymer block B | Monomer composition [g] | St | 87 | 87 |  | 87 |  |
|  |  | HEA | 1 | 1 |  | 1 |  |
|  |  | AA | 12 | 12 | 3 | 12 |  |
|  |  | BA |  |  | 48.5 |  |  |
|  |  | 2-EHA |  |  | 48.5 |  |  |
|  | Polymerization conditions [g] | Ethyl acetate |  |  | 11.2 | 10 |  |
|  |  | RAFT agent (1) | 0.5 | 0.5 | 0.56 |  |  |
|  |  | RAFT agent (2) |  |  |  | 0.5 |  |
|  |  | ABN-E | 0.2 | 0.2 | 0.16 | 0.1 |  |
|  |  | St/AA | 87.9/12.4 | 87.9/12.5 |  | 87.9/12.5 |  |
|  |  | Tg [° C.] | 103.7 | 103.7 | −54 | 103.7 |  |
| Polymer block C | Monomer composition [g] | BA | 48.5 | 48.5 |  | 48.5 | 44.1 |
|  |  | 2-EHA | 48.5 | 48.5 |  | 48.5 | 44.1 |
|  |  | MA |  |  |  |  |  |
|  |  | St |  |  | 87 |  | 8.8 |
|  |  | HEA |  |  | 1 |  |  |
|  |  | AA | 3 | 3 | 12 | 3 | 3 |
|  | Polymerization conditions [g] | Ethyl acetate | 73.5 | 73.9 | 72.7 | 47 | 40 |
|  |  | ABN-E | 0.0282 | 0.0148 | 0.015 | 0.0236 | 0.05 |
|  |  | Tg [° C.] | −62.5 | −62.5 | 103.7 | −57 | −56.4 |
| Block copolymer X |  | A/B/C |  |  |  |  |  |
|  |  | A/B + C |  |  |  |  |  |
|  |  | B/C | 11/89 | 15/85 | 11/89 | 12/88 |  |
|  |  | Mn | 170,000 | 78,400 | 203,000 | 200,000 | 120,000 |
|  |  | Mw | 530,000 | 189,000 | 750,000 | 570,000 | 490,000 |
|  |  | Mw/Mn | 3.1 | 2.4 | 3.7 | 2.9 | 4.1 |
|  |  | Acid value [mgKOH/g] | 31.1 | 33.9 | 31.1 | 31.8 | 23.4 |
| Evaluations | Adhesive strength | 20 min [N/25 mm] | 10.9 | 13.0 | 16.8 | 11.2 | 19.9 |
|  |  | 60° C. 1 day [N/25 mm] | 18 | 22.4 | 39.8 | 18.1 | 43.5 |
|  |  | 60° C. 3 days [N/25 mm] | 22.2 | 27.0 | 52.3 | 19.2 | 51.7 |
|  |  | Adhesion increase (1 day) | 1.7 | 1.7 | 2.4 | 1.6 | 2.2 |
|  |  | Adhesion increase (3 days) | 2.0 | 2.1 | 3.1 | 1.7 | 2.6 |
|  |  | Shear adhesive strength | 112.0 | 252.0 | 27.2 | 33.6 | 44.8 |
|  | Creep | 100° C. × 1 kg | ○ | ○ | × | ○ | × |

The abbreviations used in Tables 1 to 4 represent the compounds listed below. Further, the Tg value shown below inside the parentheses for each monomer represents the Tg value for the homopolymer.

St: styrene (Tg: 100° C.)

MA: methyl acrylate (Tg: 10° C.)

HEA: 2-hydroxyethyl acrylate (Tg: −15° C.)

AA: acrylic acid (Tg: 106° C.)

BA: n-butyl acrylate (Tg: −54° C.)

2-EHA: 2-ethylhexyl acrylate (Tg: −70° C.)

RAFT agent (1): a compound represented by formula (2) shown below. The RAFT agent (1) was produced using the procedure disclosed in Production Example 1 of Japanese Unexamined Patent Application, First Publication No. 2014-133801.

RAFT agent (2): a compound represented by formula (3) shown below. The RAFT agent (2) was produced using the procedure disclosed in Production Example 2 of Japanese Unexamined Patent Application, First Publication No. 2014-133801.

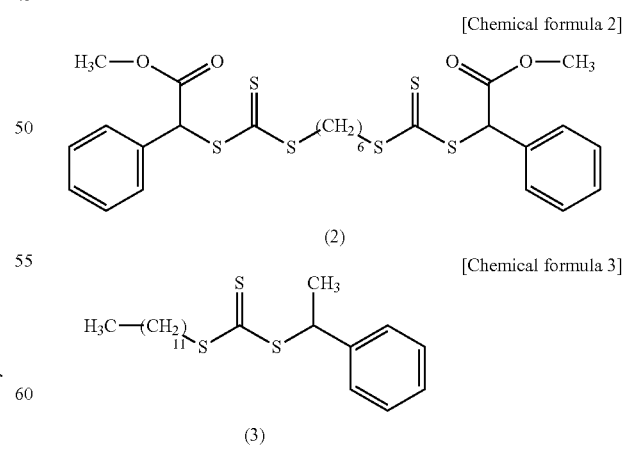

It is thought that because the RAFT agent (1) is a trithiocarbonate dimer, the block copolymers X1 to X12 obtained in Examples 1 to 9 and Comparative Examples 1 to 3 are penta-block copolymers represented by A-B-C-B-A.

Further, it is thought that the block copolymers X13 to X15 obtained in Comparative Examples 4 to 6 are tri-block copolymers represented by B-C-B.

On the other hand, it is thought that because the RAFT agent (2) is a trithiocarbonate monomer, the block copolymer X16 obtained in Comparative Example 7 is a di-block copolymer represented by B-C.

As indicated by the above results, the adhesive compositions of the various examples each exhibited little rise in adhesive strength. The adhesive strength and the creep characteristics were also favorable.

In contrast, in the case of the adhesive composition of Comparative Example 1, because the Mn value of the polymer block A exceeded 10,000 and A/(B+C) exceeded 5.0/95.0, the adhesive strength and the creep characteristics were inferior.

In the case of the adhesive composition of Comparative Example 2, because B/C was less than 5.0/95.0 and the acid value was less than 8 mgKOH/g, the adhesive strength was inferior.

In the case of the adhesive composition of Comparative Example 3, because B/C exceeded 30.0/70.0, the rise in adhesive strength was large.

The adhesive compositions of Comparative Examples 4 to 8 did not include a polymer block A, and therefore the rise in adhesive strength was large.

INDUSTRIAL APPLICABILITY

The adhesive composition of the present invention exhibits little rise in adhesive strength following bonding, making bonding adjustment easy.

The adhesive composition of the present invention can be used in various applications. For example, as outlined above, the adhesive composition may be used in applications in which the adherends are not peeled apart after bonding, and also in applications in which peeling of the adherends is necessary.

The invention claimed is:

1. An adhesive composition comprising a block copolymer composed of a polymer block A which includes a (meth)acrylate ester unit having a linear or branched side chain of 1 to 8 carbon atoms and has a number average molecular weight of 2,000 to 10,000, a polymer block B which includes at least one of an aromatic vinyl compound unit and a (meth)acrylate ester unit having a cyclic structure, and a polymer block C which includes a (meth)acrylate ester unit having a linear or branched side chain of 1 to 8 carbon atoms, wherein
   a mass ratio (B/C) between the polymer block B and the polymer block C is within a range from 5.0/95.0 to 30.0/70.0,
   a mass ratio (A/(B+C)) between the polymer block A and a total of the polymer block B and the polymer block C is within a range from 0.1/99.9 to 5.0/95.0, and
   an acid value of the block copolymer is at least 8 mgKOH/g.

2. The adhesive composition according to claim 1, wherein the block copolymer is represented by A-B-C-B-A or A-B-C-B, wherein represents the polymer block A, B represents the polymer block B, and C represents the polymer block C.

3. The adhesive composition according to claim 1, wherein the polymer block B includes a carboxyl group-containing monomer unit.

4. The adhesive composition according to claim 2, wherein the polymer block B includes a carboxyl group-containing monomer unit.

* * * * *